United States Patent
Perrin et al.

(12)
(10) Patent No.: US 6,568,629 B1
(45) Date of Patent: May 27, 2003

(54) METHOD AND DEVICE FOR MAGNETIC GUIDANCE, ESPECIALLY FOR TRACKING TARGETS

(75) Inventors: Jacques Perrin, Montigny le Bretonneux (FR); Sylvain Baudas, Montrouge (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 09/926,565

(22) PCT Filed: May 16, 2000

(86) PCT No.: PCT/FR00/01307
§ 371 (c)(1),
(2), (4) Date: Nov. 19, 2001

(87) PCT Pub. No.: WO00/70364
PCT Pub. Date: Nov. 23, 2000

(30) Foreign Application Priority Data

May 17, 1999 (FR) .............................. 99 06228

(51) Int. Cl.$^7$ .............................. F41G 7/28; F41G 7/30; G01S 13/44
(52) U.S. Cl. ...................... 244/3.14; 244/3.11; 342/62; 342/149
(58) Field of Search .............................. 342/61, 62, 63, 342/64, 65, 73, 74, 75, 76, 77, 78, 79, 80, 147, 148, 149, 150, 151, 152–158, 175, 195, 25; 244/3.1, 3.11, 3.12–3.14, 3.15–3.22

(56) References Cited

U.S. PATENT DOCUMENTS 4,843,459 A  6/1989  Perrin et al.
5,473,331 A  * 12/1995  Kennedy et al. .............. 342/62

FOREIGN PATENT DOCUMENTS

JP  2000-65925 A  * 3/2000  ........... G01S/13/66

* cited by examiner

*Primary Examiner*—Bernarr E. Gregory
(74) *Attorney, Agent, or Firm*—Oblon, Spivak, McClelland, Maier & Neustadt, P.C.

(57) ABSTRACT

A process and a device for electromagnetic guidance of a craft, applied in particular to the tracking of targets. Guidance is carried out with respect to the axis of the beam of a monopulse antenna, by coding in space of the beam. The coding is carried out by appropriate modulation of the signals radiated by a sum pattern and difference pattern. A receiver is disposed in the craft to make it possible to determine the position of the craft with respect to the antenna radiation patterns, and hence its position with respect to the axis of the antenna, the determination of this position being performed by demodulating the signals captured by the receiver. The process and device may be applied in particular in respect of the guidance of any number of missiles or intelligent munitions, for example in the tracking of targets.

17 Claims, 6 Drawing Sheets

METHOD AND DEVICE FOR MAGNETIC GUIDANCE, ESPECIALLY FOR TRACKING TARGETS

BACKGROUND OF THE INVENTION

1. Field of the Invention

The present invention relates to a process and a device for electromagnetic guidance, applied in particular to the tracking of targets. It applies in particular in respect of the guidance of any number of missiles or intelligent munitions, for example in the tracking of targets.

2. Description of the Background Art

The guidance of missiles and intelligent munitions requires a precision which depends on the nature of the target, as well as on the size and principle of operation of the associated warhead.

In the case of short and very short range tactical missiles (between 5 and 12 km range) which alone can be guided remotely, the longest ranges requiring auto-guidance modes, the precision required for the guidance can be summarized along the following lines.

Depending on the type of warhead the guidance precision must allow this warhead to fulfill its role; this precision can vary between 0.1 meters and 5 meters. The greatest precision applies to small missiles using the kinetic effect of a penetrator against targets of very small dimension (drones or tactical missiles), the lowest precision is applicable to missiles using a warhead with a charge of several kilograms, associated with a proximity fuse against lightly armored or unarmored objectives.

In remote guidance, the system relies on one or more remotely sited sensors, generally sited on the launch platform, which undertake the location of the target and of the missile or missiles (or projectiles) launched against this target.

Given the precision demands cited above, it follows that the angular precision of these sensors cannot be less than this.

These sensors using an electromagnetic means (radar or optical) have a diffraction limited resolving power. If one sets a reasonable order of magnitude for the diameter of the aperture of these sensors, namely 1 meter for radar antennas and 0.1 meters for visible or infrared optical ones, it is noted that onward of the infrared IV band (8–12 microns wavelength) the precision of location must be better than the diffraction spot. Whereas the gain in precision with respect to the diffraction spot is modest for infrared, it is considerable for the radar bands.

In general, such a specification regarding precision is not compatible with the precision of mechanical aiming of a sensor installed on a military platform, and at the very least the system will require stabilization of the line of sight.

Moreover, when the sensor serving to track the target is not the same as the sensor serving to locate the missile or missiles, a serious problem arises of collimating these sensors which is almost unachievable for the severest demands of precision.

An elegant way of solving this problem is to use a single sensor for target and missile location and to take the difference of the measurements according to the principle of "double weighing" which is well known to physicists. This principle has been dubbed "differential deviometry", and has the merit of getting rid of most instrument errors such as shifting of the zero and all errors of aiming within the specification regarding precision of location of the missile with respect to the target.

Certain instrument errors such as errors of gain or of slope of the angle measurements which might not be identical for the target measurement and missile measurement are deterministic and can be compensated for to the extent that they may be known.

The specification then still contains errors such as the terms which are not absolutely deterministic, like the errors related to the noise of the system which among other things includes noise of thermal origin and noise related to the propagation environment for the electromagnetic waves employed.

When one wishes to operate relatively independently of the conditions of illumination and visibility, one is then led to choose a sensor of radar type.

The known solution of this type is broadly applied to tactical missile systems, in particular anti-aircraft systems.

In these systems, a tracking radar is furnished with several elevation and bearing measurement pathways which, in shared time, undertake the position measurements for the target and one and sometimes two missiles which are constrained to remain within the field of vision of the sensor generally of the order of magnitude of one degree of angle. For this reason, the missile or missiles remain substantially aligned with the moving line joining the radar sensor and the target, hence the name alignment guidance for this mode of operation.

To the extent that the position of the missile is remote with respect to the guidance platform, a transmission link (remote control) is necessary in order to convey the position thereof or more generally trajectory correction commands to the missile.

The locating of a missile and a fortiori of intelligent munitions of more modest size, requires that the radar signature of this missile or of these munitions be strengthened by means of a radar "responder" which is appended to the necessary remote control receiver. It is appreciated that such an assembly is of a complexity such as to severely burden the weight and cost specifications of missiles to which they apply.

A simpler solution has been applied, especially in optical mode, in which the missile or missiles locate themselves with respect to a theoretical guidance axis associated with a director beam.

Hence the name beam navigation for this type of guidance, also known as "Beam Rider". To do this, a spatially modulated beam projector is locked mechanically onto the detection axis of a tracking sensor.

A special receiver on board the missile decodes the modulation of the beam and determines its position with respect to the theoretical guidance axis and deduces any corrective maneuvers therefrom.

The space coding method employed is in general a two-dimensional scan of a pencil of light or of a double scan in elevation and bearing of two pencils having a narrow shape in one plane and fanning out in the other. Both methods as well as their numerous variants have the common denominator of being limited in terms of precision by the size of the diffraction spot and by the precision of the collimation of the beam projector and of the tracking sensor as well as of the precision of the mechanical tracking.

This precision can be slightly improved at the cost of greater complexity:

If the conditions of steadiness of the propagation so permit, the measurement precision can be sharpened by interpolating between several positions of the beam and the measurement precision can be lowered slightly below the defraction spot without being able to expect much better than a quarter or a half of the latter. In respect of the collimation errors, they may in principle be measured and compensated at the cost of a complex autocollimation system.

The tracking errors, except when the tracking loop is closed up manually via a human operator, are determined by means of an automatic tracking device; it is therefore possible in theory to carry out the inverse correction in the coding of the beam so that the measurement made by the missile has as origin the position of the target in the observation field and not a fixed mechanical reference.

However, owing to their cost and complexity, these refinements are rarely encountered in practice, thereby limiting the known use of beam navigation to very short range systems (at most 5 to 6 km) and using optical wavelengths, in general that of a laser operating in the visible or the near infrared (wavelength of around 1 micron). Furthermore, performance is dependent on the conditions of illumination and visibility, in a manner inherent to any optical system.

The beating beam systems described above are not able to be extended to radar wavelengths, since for practical antenna dimensions in the missiles involved, they do not permit the required precision.

To operate beam guidance in the domain of radar, consideration has been given to the use of the principle known by the name of conical scanning, this in fact being a variant of the principles above, mechanical scanning being obtained by rotating the radiation pattern of an antenna around an axis not pointing along its axis of revolution.

As a result, the gain in any direction other than that of the axis of rotation is modulated in a time periodic manner with a phase and an amplitude which are directly related to the polar coordinates of this direction in the field of observation.

For a radar, it is thus possible simultaneously to modulate the gain on transmission and on reception, this being the simplest solution, although in principle the modulation of a single pathway is sufficient.

If the transmission pathway is modulated, the modulation is easily detected by a countermeasures receiver, and a jamming transmission modulated at the same frequency will inevitably cause tracking to be lost, this making such a device very sensitive to jamming by a jammer even if the latter is carried by the target. Modulation on reception alone is a little less fragile but cannot be used for beam guidance, since, the transmission no longer being modulated, the missile cannot self-locate.

The technique of conical scanning has been abandoned for radars because of its sensitivity to jamming, and also to the other causes of amplitude fluctuation of the signal received, such as the unsteady nature of the propagation conditions in relation to the necessarily fairly slow mechanical scanning rates.

SUMMARY OF THE INVENTION

An aim of the invention is to alleviate the aforesaid drawbacks, by permitting in particular the guidance of craft with respect to a radar beam without risks of jamming. Accordingly, the subject of the invention is a process for the electromagnetic guidance of at least one craft, characterized in that the guidance is carried out with respect to the axis of the beam of a monopulse antenna, by coding in space of the beam. The subject of the invention is also a device for implementing the above process.

The main advantages of the invention are that it allows guidance of craft with respect to the antenna beam while undertaking target position measurements, that it allows very simple embodying of the receivers, that it allows the guidance of very crude or very small craft, that it can be easily combined with other means of guidance such as optical means or seekers to obtain multimode guidance, doing so without overly adding to the complexity of the system, that it allows very good precision of the craft position measurements, that it allows information to be sent simultaneously to the various craft and that it is economical.

BRIEF DESCRIPTION OF THE DRAWINGS

Other characteristics and advantages of the invention will become apparent with the aid of the description which follows in conjunction with the appended drawings which represent.

DESCRIPTION OF THE PREFERRED EMBODIMENTS

The process according to the invention uses one and the same monopulse antenna to carry out spatial coding capable of being employed in a beam navigation system. The monopulse antenna is for example disposed on a launch platform from which the craft are launched and then guided.

In a so-called "monopulse" measurement system, the reception pathway of the antenna is split in each elevation and bearing plane into a sum pathway and a difference pathway. The signal received on the difference pathway is proportional in amplitude to the aim offset of the target and in phase or in phase opposition with the sum signal received from the same target. It follows that coherent phase processing of these two signals makes it possible to retrieve the aim offset angle $\epsilon$ together with its sign, according to the following relation (1);

$$\varepsilon = \frac{\vec{\Delta} \cdot \vec{\Sigma}}{\Sigma^2} \quad (1)$$

$\vec{\Delta}$ and $\vec{\Sigma}$ respectively being the signals received on the difference and sum pathways, expressed in vector form taking account of the amplitude and phase.

Such processing can be done in a time equal to that of the coherent integration of the radar, for example one pulse, hence the name monopulse.

In such a system any conventional jammer carried by the target will merely coherently strengthen the sum and difference signals and will facilitate the angular measurement instead of jamming it, hence the great difficulty in jamming the angular measurement of monopulse radars by autoprotection jammers. A monopulse measurement also makes it possible to obtain high precision.

Figure 1:
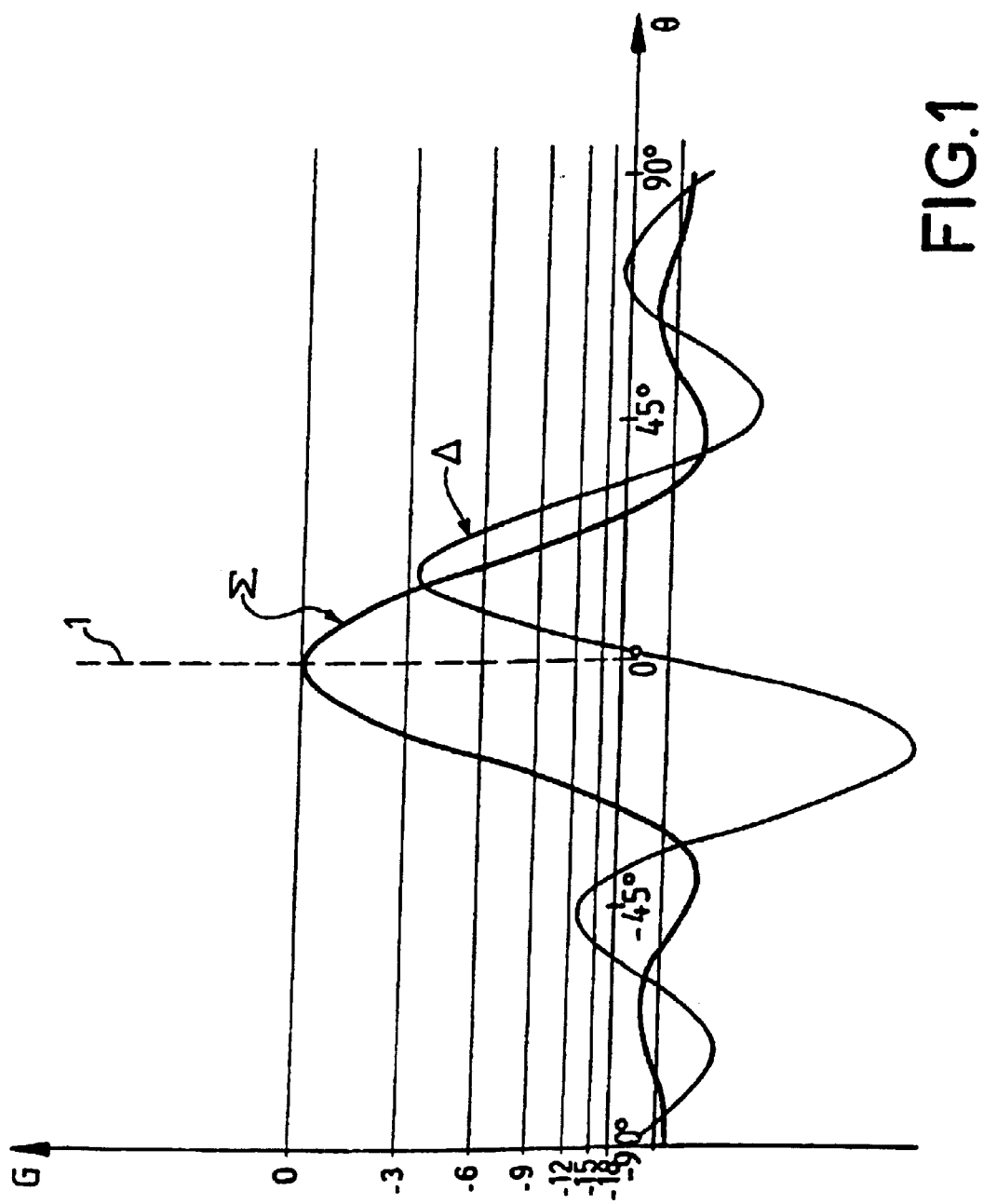
FIG. 1 is a representation of the sum and difference patterns of a monopulse antenna.

FIG. 1 illustrates the known patterns of the sum Σ and difference Δ pathways of a monopulse antenna in a system of axes, where the ordinate axis represents the antenna gain G as a function of the space angle θ, represented by the abscissa axis, with respect to the axis of the antenna 1. The sum pattern is a maximum on this axis, and is symmetric with respect to the latter. In a monopulse antenna radar, the signal received on the difference pathway is proportional in amplitude to the aim offset of the target, charted along the angle axis θ, and in phase or in phase opposition with the signal received from the same target on the sum pathway. It follows that coherent phase processing of these two signals makes it possible to retrieve the aim offset angle ε together with its sign as indicated by the previous FIG. (1).

According to the invention, a monopulse antenna is therefore used to generate a beam coded in space, with a view to guiding one or more craft, for example missiles or projectiles, which may be of undetermined number. This coding of the beam allows a craft, equipped with appropriate means of reception to position itself with respect to the axis of the beam. This coding is carried out for example by appropriate modulation of the signals radiated by the sum and difference patterns. A receiver then disposed in a craft makes it possible to determine the position of the latter with respect to the antenna's radiation patterns, and hence its position with respect to the axis of the antenna. The determination of this position is performed by decoding or demodulating the signals captured by the receiver.

To preserve the intrinsic quality of monopulse processing, the process according to the invention must utilize a sum signal and a difference signal based on amplitude and phase. It is therefore necessary that, on the basis of a straightforward receiver, a missile should for example be able to determine the signals which come from the sum pathway and those which come from the difference pathway, that is to say it can determine the amplitude of phase-coherent difference and sum signals. In fact, it has to successfully mix two signals, one emanating from the sum pathway and the other emanating from the difference pathway, which are on the same carrier frequency but which must be capable of being separated on reception. To do this, energy is radiated on the sum Σ and difference Δ patterns, and the energies thus radiated on the sum pattern and on the difference pattern are marked by means of a separate modulation, different from one pattern to the other, so as to be able to separate them on reception. The quantities to be determined being amplitudes, amplitude modulations are performed in preference to phase or frequency modulations for which the amplitude of the carrier wave is not retrieved.

The invention advantageously uses the fact that the actual structure of the spectrum of an amplitude modulated signal is the sum of the modulation spectrum transposed about the frequency of the carrier wave and of a spectral line on the frequency of this carrier. Letting $A(2j\pi f)$ denote the Fourier transform of the modulation, the Fourier transform of the modulated wave, denoted $M(2j\pi f)$ is given by the following relation:

$$M(2j\pi f)=A_0[\delta(f-F_0)+\delta(f+F_0)]+B.A[2j\pi(f-F_0)] \quad (2)$$

For a frequency f of between −∞ and +∞.

The first term $A_0[\delta(f-F_0)+\delta(f-F_0)]$ represents the modulation of the carrier and the second term $B.A[2j\pi(f-F_0)]$ represents the modulation of the frequency sidebands. $F_0$ represents the frequency of the carrier wave and $A_0$ is a scalar which characterizes the amplitude of this carrier. B is another scalar, positive or negative, which characterizes what may be called the depth of modulation. The symbol δ represents the Dirac function. $|A_0| \geq |B|$ is a condition such that there is in particular no overmodulation of the carrier with respect to the sidebands.

If the first term is deleted, then the spectrum of a so-called suppressed-carrier signal is obtained. If a sinusoidal signal which is synchronous in amplitude and in phase with the carrier is added to a suppressed-carrier amplitude modulated signal, then an amplitude modulated signal is retrieved, the depth of whose modulation is dependent on the compared amplitude of the initial signal and the carrier thus added. According to the invention, this added carrier is transmitted on the sum pattern and a suppressed-carrier amplitude modulation on the difference pattern. Stated otherwise, there is superposition for example of a continuous pure wave, the so-called CW, and of a suppressed-carrier amplitude modulated wave on the difference pattern, this being so as to make it possible to reconstruct an amplitude modulated signal at the level of the receiver of each guided craft. The degree of modulation of this signal and its phase are characteristic of the aim offset of the craft, more precisely of its position with respect to the axis of the monopulse antenna, which is in fact the craft guidance axis. The degree of modulation, which in fact corresponds to the aforesaid depth of modulation, gives the value of the aim offset, whereas the sign of the phase indicates on which side of the axis of the antenna the craft lies.

Figure 2:
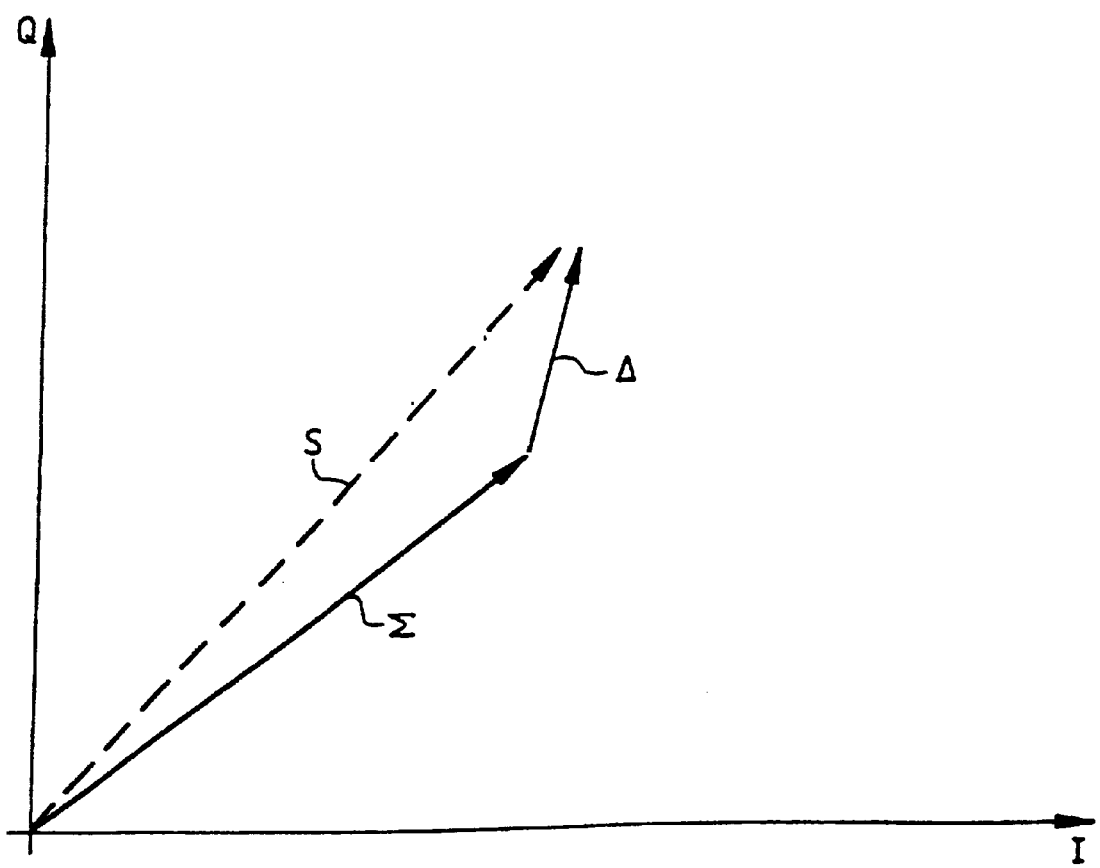
FIG. 2 is a representation in a Fresnel diagram of a signal obtained at the level of the receiver of a guided craft, by combining a signal produced by the sum pathway and a signal produced by the difference pathway of a monopulse antenna.

FIG. 2 illustrates, in a Fresnel diagram, this mixture of signals. The signal S received by the receiver of a guided craft, is the sum of the sum signal Σ and of the difference signal Δ amplitude modulated. The sum signal Σ is for example a continuous wave CW and the difference signal Δ a wave modulated according to the second term in the preceding relation (2).

On reception, the amplitude demodulation therefore supplies the modulation signal together with a sign and an amplitude which are characteristic of the aim offset of the receiver with respect to the monopulse beam, more precisely with respect to the axis of the mono-pulse antenna. To retrieve the phase ratio and amplitude ratio of the sum and difference signals which gives the aim offset according to relation (1), it must be possible to reconstruct $A_0$ and B.

One way according to the invention of retrieving the signals emanating from the sum and difference patterns is for example to determine on reception the depth of modulation in respect of the amplitude and to determine the sign of the modulated signal by comparing the phase of the demodulated periodic signal with that of a clock reset by a synchronization signal transmitted on the sum channel. It remains to find wave forms for the modulation, which are easy to implement and which allow the depth of modulation to be retrieved easily.

Figure 3:
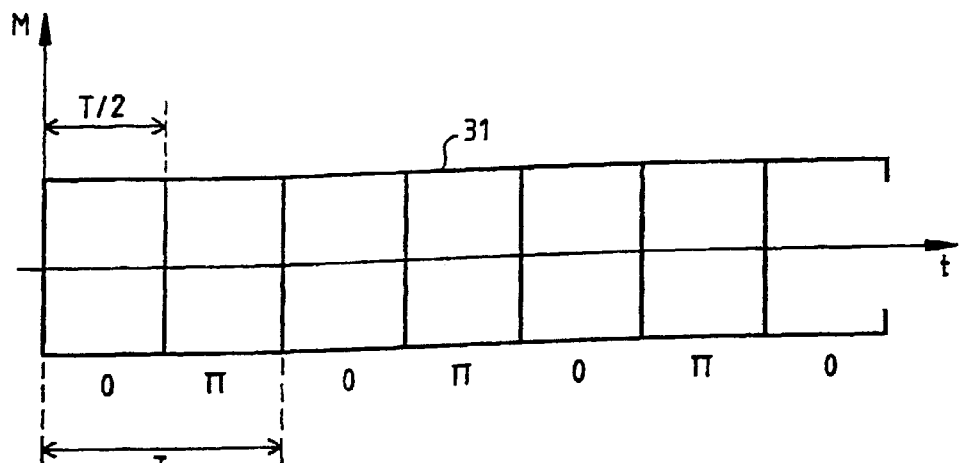
FIG. 3 is an example of a possible implementation of the process according to the invention through an example of modulating the signal produced by a difference pathway of a monopulse antenna.

FIG. 3 illustrates a form of modulation according to the invention which advantageously makes it possible easily to retrieve the depth of modulation. This modulation is a square modulation of phase 0, π In this case, the amplitude of the modulation is square, with zero mean value, and from one half-period to the next the phase goes from 0 to π, then from π to 0, and so on and so forth. FIG. 3 depicts this modulation 31 in a system of axes, where the abscissae t represent time and the ordinates M represent modulation. Underneath the representation of the modulation 31, appears the phase of the corresponding modulation, 0 or π, corresponding to the half-period T/2. The phase going from 0 to π amounts to shifting the modulation by the half-period T/2, hence the resulting shape as represented by FIG. 3. This modulation is nothing other than the result of a suppressed-carrier square modulation, by virtue of the zero mean value of the modulation.

Figure 4:
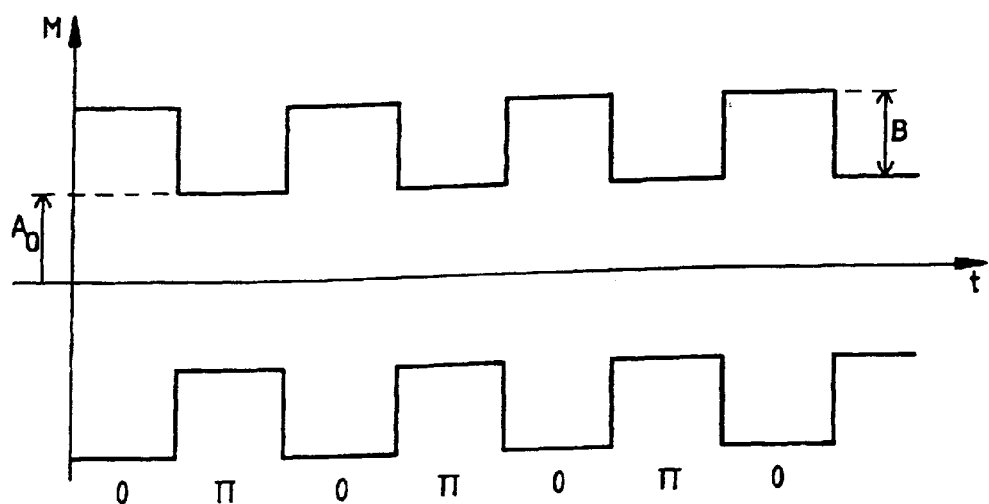
FIG. 4 is the global modulation of the signal obtained at the level of the receiver of a guided craft.

FIG. 4 depicts, in the same system of axes M, t, the shape of the modulated signal obtained at the level of a receiver. The modulation of FIG. 3, imparted to the signal transmitted by the difference pathway Δ is then summed with the signal from the sum pathway Σ, whose amplitude is $A_0$, the signal in fact varying between $+A_0$ and $-A_0$. The depth of modulation B is given by the deviation between the amplitude $A_0$ and the maximum amplitude of the modulation. This deviation is very easy to obtain. It is proportional to the gain $G_{66}$ of the antenna on the difference pathway, this gain defining the antenna pattern as illustrated by FIG. 1. Likewise, the amplitude $A_0$ is proportional, in the same ratio of proportion, to the antenna gain $G_\Sigma$ on the sum pathway. The ratio $G_A/G_\Sigma$ gives the value of the aim offset with respect to the axis 1 of the antenna, in accordance with relation (1), where the signals $\vec{\Delta}$ and $\vec{\Sigma}$ are respectively proportional to the gains $G_A$ and $G_\Sigma$.

It remains to define on which side of this axis the receiver is situated. This situation is defined by the sign of the phase. To utilize this sign, it is however necessary to know the phase at the origin, that is to say the reference phase of the demodulated difference signal. To determine the phase of the modulation in this way, it is then for example possible to use a preliminary synchronization signal transmitted immediately before a position measurement. For this purpose, this signal comprises for example a clock signal whose rising edge is for example keyed to the switch from the phase 0 to the phase π, this edge being taken into account by a receiver. This preliminary synchronization signal can furthermore serve to mark the measurement as being a measurement in elevation or in bearing, thereby avoiding in particular simultaneous transmission on the elevation difference Δ pathway and bearing difference Δ pathway.

The synchronization signal can also be an amplitude modulated signal modulated according to a predefined pseudorandom code, compressed by means of a correlator at the reception end.

The same transmission channel which makes it possible to send elevation and bearing synchronization words also makes it possible to send, to the one or more guided craft, the error in position of the target, which is the subject of the tracking, in terms of elevation or bearing as measured by the radar, by means of the elevation and bearing patterns of the same monopulse antenna, that is to say with the same causes of error, making it possible by differencing to determine a differential deviometry value for the deviation between the various guided craft and the target which eliminates the main part of the measurement errors due to the imperfections of the monopulse pattern and to the tracking errors.

It is possible to use other forms of modulation than that illustrated in relation to in FIG. 3, provided that they are for example periodic and of zero mean value. It is thus possible to use a succession of pulses of alternate signs, whose suppressed-carrier modulation is a succession of 0, π phase modulated pulses.

Another solution can consist for example in using a pseudorandom code of zero mean value and of finite length for the modulation. By correlating the demodulated signal on reception with this code, a signal is obtained whose sign and amplitude represents the deviation with respect to the center of the beam, the mean value of the signal received being the value of the sum signal. Correlation of the signal originating from the demodulation of the envelope of the signal received, with the code used on transmission, in fact supplies a pulse whose amplitude relative to the mean value of the amplitude of the signal received and whose sign are equivalent to the ratio $G_A/G_\Sigma$ of a conventional monopulse receiver. A difficulty may in particular stem from the fact that when the offset in aim is small, the demodulated signal may be swamped in noise, and one does not then know at which instant to sample this noise as representing the measurement, unless one has access to a synchronization by which it is possible to ascertain the instant which corresponds to the correlation spike of the difference pathwayway Δ.

To obtain this synchronization, it is possible to perform a preliminary transmission on the sum pathwayway advanced by an uncompressed pulse width, itself amplitude modulated in all or nothing mode by another pseudorandom code, called a sigma code. On reception, this sigma code is for example used by a correlator to determine the exact instant of correlation and to synchronize the instant of sampling of the difference pathways transmitted sequentially one period T and two periods T after the synchronization code. A variant of the process according to the invention may for example consist in transmitting on both difference pathways at the same time with two mutually orthogonal codes.

It should moreover be noted that at the start of guidance there is a so-called homing phase, during which the initially guided craft situated a certain angular distance from the guidance beam, must home in on the latter. This initial distance is not in general compatible with the aperture of the overly narrow guidance beam in proximity to a monopulse antenna. It is then preferable to provide an ancillary system for determining the position of the craft with respect to the guidance beam during this relatively short phase, where the craft is a relatively short distance away. This can for example be carried out with an optical homing deviometer, it being possible for the measurements to be sent to the craft via the radar transmitter. In general, the proximity of the craft allows this link even if the craft is outside the main pattern of the radar antenna. Nevertheless, an antenna with a larger transmission aperture may be employed for this phase if maximum security is desired for this link. If such a homing antenna is envisaged, it can itself be monopulse, and the initial homing guidance may then be carried out on the same beam navigation ("beam riding") process as that developed earlier, but with the possible risk of these measurements being greatly disturbed on account of the proximity of the ground and the known multipath effect which results therefrom.

In the guidance phase, and more particularly at long range, there is scarcely any need for the dynamic measurement swing of a conventional monopulse antenna, whereas on the contrary when homing is completed, one might seek the maximum dynamic swing of the angle measurement. By altering the power of the signal transmitted on the difference pathway relative to the power of that transmitted on the sum pathway, it is for example possible to carry out within the limits related to the shape of the patterns and the signal-to-noise ratios a sort of electronic zoom which makes it possible simultaneously to optimize the domain of capture of the craft in respect of homing and its long-range locating precision.

It is further possible, in order to locate the target, to use the measurement made on the ground from the energy reflected back by the target and received on the sum pattern after the propagation delay.

It should be noted that the tracking radar thus embodied possesses just a single reception pathway, unlike the three pathways of a conventional monopulse radar. The target deviometry measurements may of course be used in a tracking loop, but they may equally be sent via the transmitter to the one or more craft to be guided, with appropriate modulation, so that the craft performs in particular the determination of its position differentially with respect to the objective and eliminates the majority of the tracking errors. This same transmission pathway to the craft may also be used to supply the craft with any information it needs to optimize its guidance, such as for example the kinematic data corresponding to the angular velocities of the guidance beam, to the distance and to the radial velocity of the target. Thus, the ground transmitter can use the antenna pattern to send information to the various craft, in particular to inform them of the position of a tracked target with respect to the antenna beam, thereby making it possible to determine their relative positions with respect to the target, as well as any aforesaid or other information useful for optimizing their guidance.

The extreme simplicity of the reception pathway on board the guided craft makes it possible for example to envisage combining this pathway with other means of guidance such as those required for optical beam navigation or alternatively means of guidance such as an end of journey seeker so as to obtain multimode guidance without however adding overly to the complexity of these other means of guidance. Finally, this same simplicity makes it possible to envisage the mode of guidance according to the invention on very crude or very small craft, for example missiles or projectiles.

Figure 5:
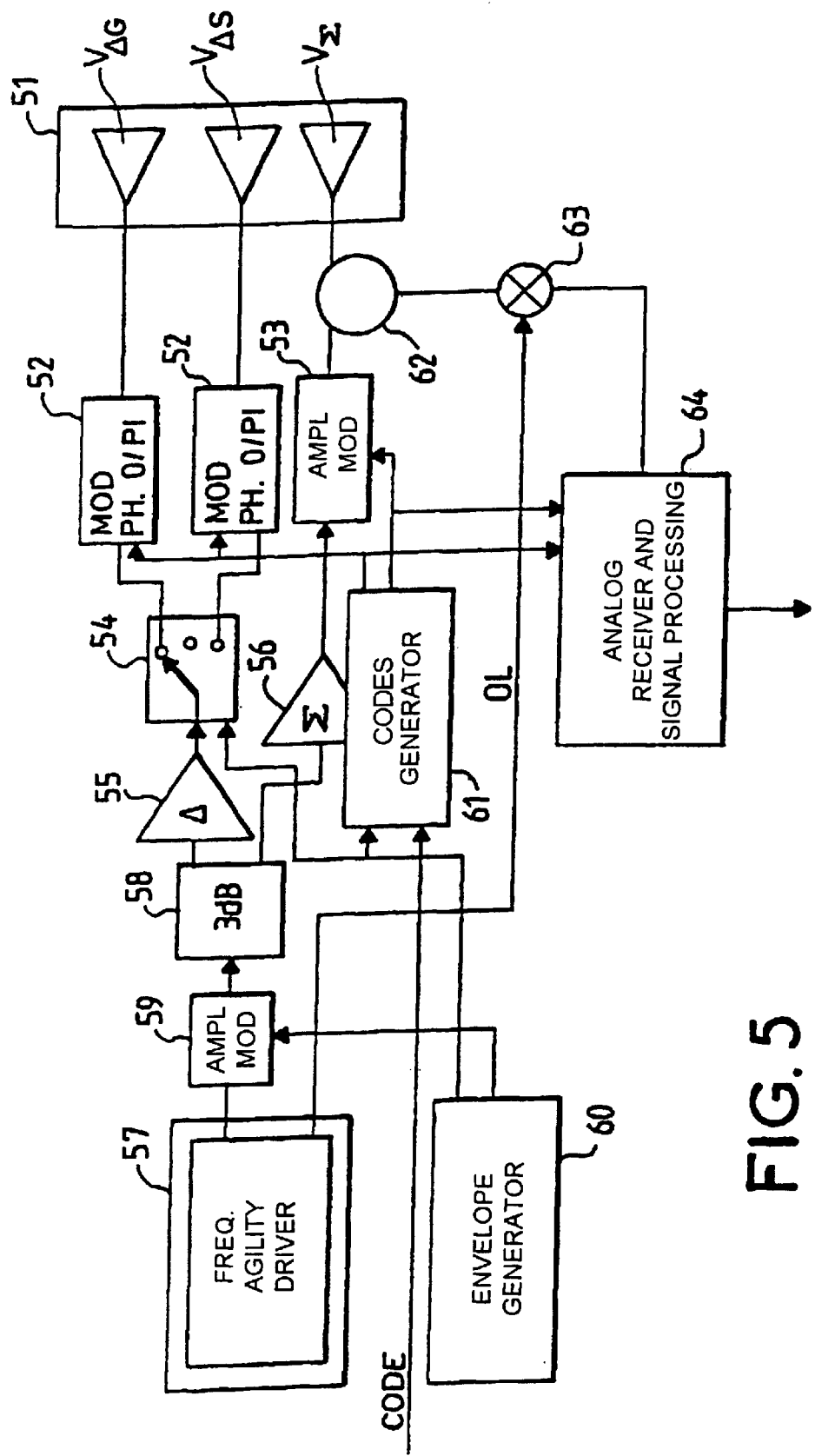
FIG. 5 is an example of a possible embodiment of means of embodiment of a craft guidance beam, according to the invention.
Figure 6:
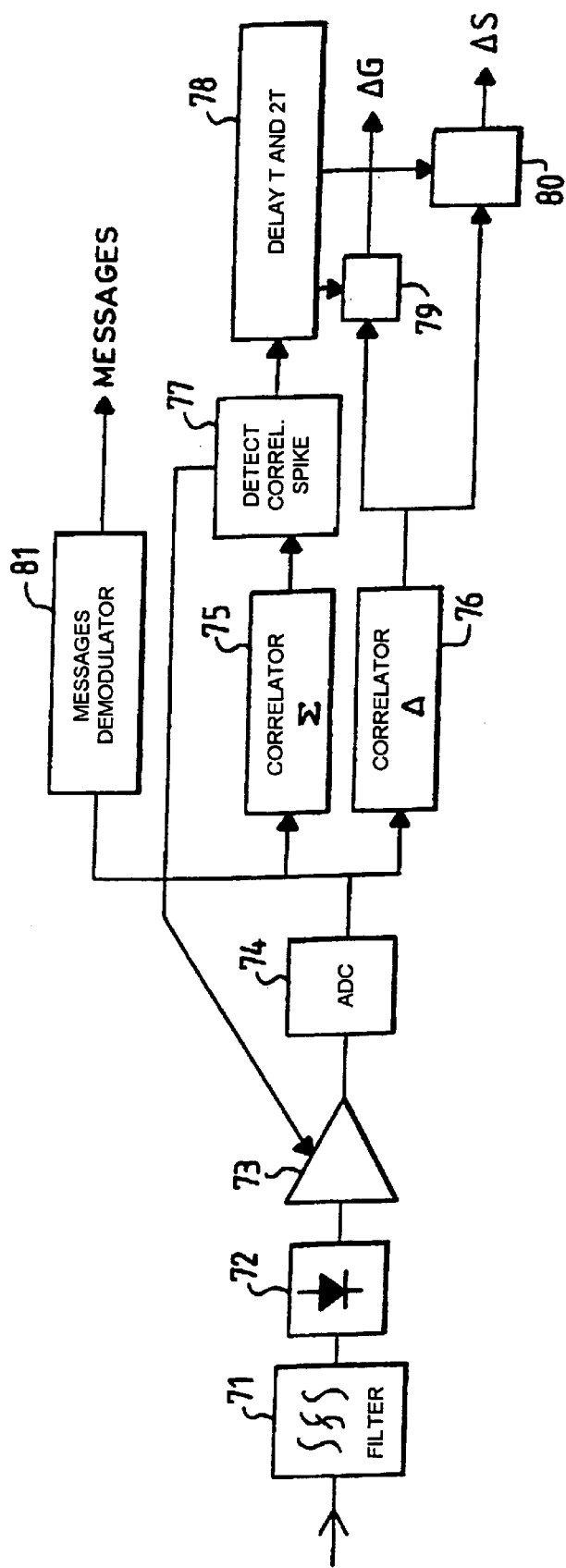
FIG. 6 is an example of a possible embodiment of a receiver disposed in a craft guided by the aforesaid beam.

FIG. 5 illustrates an example of a possible embodiment for implementing the process according to the invention. More particularly, this figure depicts a possible embodiment of the radar part which transmits in particular the guidance beam, this part being for example situated on a platform. FIG. 6 illustrates a possible embodiment of a receiver stowed on board a craft.

Limiting ourselves for example to an order of magnitude of a meter for the antenna diameter, the transmission frequency bands may be selected in particular among the Ku, Ka and W bands. A selection criterion is related to the functional operating demands, for example in foggy or rainy weather. The effects of these atmospheric phenomena are in particular exponential absorption with respect to propagation distance expressed in decibels per kilometer. A second effect, in the case of rain, is a back reflection on the raindrops generating rain echoes behaving like moving echoes with a mean radial velocity and spectral width dependent on the wavelength of the wind and the atmospheric turbulence. Measurements and experiments performed by the applicant have shown that up to distances of the order of 10 km, absorption by water is not a real problem. On the other hand, rain echoes may be unacceptable beyond the Ku band on account of the near-impossibility of eliminating them by Doppler filtering in the target tracking pathway. It therefore seems advantageous to select the Ku band, it being possible for example also to use the Ka band if operation during rainy weather is not demanded. In the latter case, the W band can also for example be used for very short range applications.

FIG. 5 therefore depicts a possible embodiment of the radar part intended in particular to produce the navigation beam. This part comprises a monopulse antenna 51 consisting of a sum pathway $V_\Sigma$, of a list difference pathway $V_{AS}$ and of a bearing difference pathway $V_{AG}$. Electromagnetic isolation, greater than 45 dB for example, is achieved between the sum pathway and the difference pathways. For transmission, each difference pathway is linked to a modulator 52 which modulates the wave to be transmitted according to a 0, $\pi$ phase modulation, as defined previously, and the sum pathway is for example linked to a modulator 53 which modulates the amplitude of the wave to be transmitted. This modulator is for example used when a pseudorandom code of zero value is generated on the sum pathway. The inputs of the modulators of the difference pathway are linked to a microwave switch 54 which switches the signals supplied by a first amplifier 55 to one or other of these two pathways. The input of the modulator of the sum pathway is linked to the output of a second amplifier 56. The microwave signals supplied to the amplifiers 55, 56 emanate from the same microwave source 57 via a 3 dB coupler 58. An amplitude modulator 59 is for example disposed between the microwave source and the coupler. This modulator carries out a zero mean value modulation of the amplitude of the signal which it receives. For this purpose it is controlled by an envelope generator 60 which additionally controls a codes generator 61. The envelope generator 60 produces the envelope of the aforesaid modulation. The code generator 61 serves in particular to supply a preliminary synchronization signal on the sum pathway and can for this purpose control the modulator 53 of the sum pathway. It also serves to control the modulators 52 of the difference pathways so as to transmit on these pathways a signal modulated according to a pseudorandom code with zero mean value. It can additionally serve to control, as a function of a signal, for example a square signal, supplied by the envelope generator, the switching of the phases from 0 to $\pi$ or $\pi$ to 0 in the modulators 52 of the difference pathways.

The radar system as described previously makes it possible to produce a navigation beam transmitted by a monopulse antenna, whereby craft to be guided can home in on this beam, in accordance with the process according to the invention. As indicated previously, it may additionally be necessary to use the radar functions on reception, in particular to allow measurements of position of a target to be tracked, and thus make it possible to control the position of the antenna, and hence the direction of its beam, as a function of the position of the target. For this purpose, a single reception pathway can be used, the sum pathway in particular. A duplexer, or microwave circulator 62, is therefore disposed on the sum pathway between the antenna and the modulator 53 of this pathway. The reception output of this duplexer is for example linked to an input of a mixer 63 whose other input receives as local oscillator signal, for example a signal emanating from the frequency source. The reception signal thus frequency transposed is sent to conventional reception and signal processing means 64. These means are for example synchronized with the transmission signals by way of the codes generator 61. The latter additionally receives a code intended for supplying information to the guided craft as was mentioned earlier, this code being sent by way of the sum pathway.

FIG. 6 depicts a possible embodiment of a receiver. The latter comprises for example at input a filter 71 followed by a direct detection device 72. The signal thus filtered and detected is supplied to a linear video amplifier 73 with automatic gain control whose output is linked to an analog/digital converter 74. The signal thus digitized is processed by two correlators 75, 76. A correlator 75 is assigned to the processing of the signal of the sum pathway and a correlater 76 is assigned to the signal of the difference pathway. The two correlaters nevertheless receive the same signal, namely the digitized reception signal at the output of the converter 74. These correlaters operate on the basis of shift registers with a higher sampling frequency than that of the clock generating the pseudorandom code, in the case where the modulation is carried out by such a code. In particular this allows asynchronous operation of the correlaters, in particular of the one intended to extract the modulation signal of the difference pathway. A correlation spike detector 77 is placed at the output of the correlater assigned to the processing of the sum pathway. A delay device 78 is connected at the output of the detector 77. By detecting a correlation spike, this device successively creates a first delay of T and a second delay of 2T. A signal is generated at each delay. A first signal, generated according to the first delay T, controls a first gate 79 whose input is linked to the output of the correlater 76 of the processing of the difference pathway. Likewise, a second signal, generated according to the second delay 2T, controls a second gate 80, whose input is linked to the output of the correlater 76 of the processing of the difference pathway.

Figure 7:
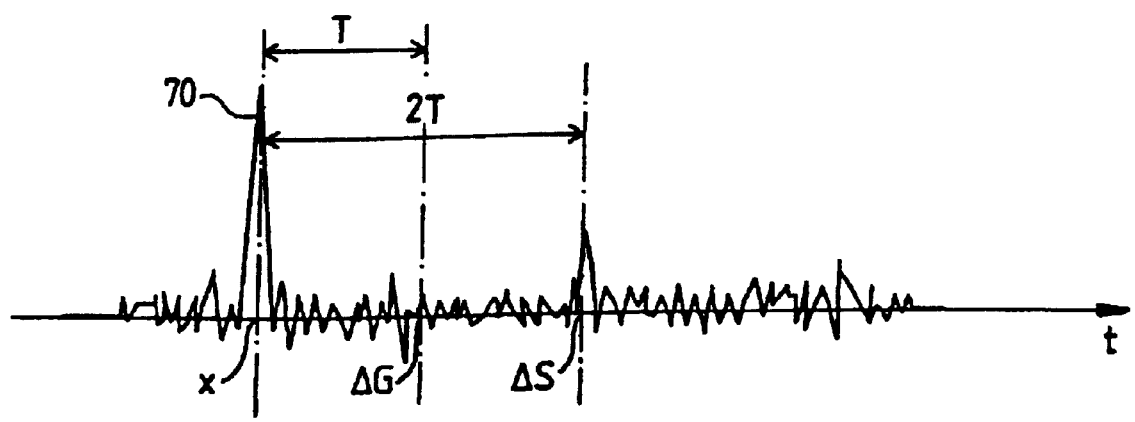
FIG. 7 is the position in time of correlation signals making it possible to reconstruct at the level of a receiver, the position of the latter with respect to the axis of the monopulse antenna, by knowing the signals produced by the sum and difference pathways of this antenna.

FIG. 7 illustrates the position in time of the signals of the output of the first and of the second gate, respectively of amplitudes ΔG and ΔS. These signals are the signals present at the output of the correlater 76 of the processing of the difference pathway respectively T and 2T after the correlation spike 70 at the output of the correlater 75 of the processing of the sum pathway. The deviation in bearing, giving the term B alluded to previously in respect of the bearing decoding, is K.ΔG/Σ, and the deviation in elevation giving this term B for the elevation decoding, is K.ΔS/Σ, K is a scale factor and Σ is the amplitude of the signal corresponding to that transmitted by the sum pathway. This amplitude Σ is for example the content [lacuna] the output of the correlater of the sum pathway or else the mean value of the signal from x to T for the bearing difference pathway 79 and between x+T and x+2T for the elevation difference pathway, x being the instant of the correlation spike on the sum processing pathway.

A demodulation device 81, connected at the output of the analog/digital converter 74 makes it possible for example to decode messages dispatched by the sum pathway.

What is claimed is:

1. Process for electromagnetic guidance of at least one craft, comprising:
    transmitting from a monopulse antenna a guidance beam having a radiation pattern spatially coded with respect to an axis of the monopulse antenna, comprising coding the beam by superposing an unmodulated wave onto a sum pattern and a suppressed-carrier amplitude modulated wave onto a difference pattern;
    receiving at the craft the spatially coded beam and reconstructing an amplitude modulated signal, and
    guiding the craft based on a degree of modulation and a phase of the amplitude modulated signal which are characteristic of the spatial offset of the received beam from the axis of the antenna.

2. Process according to claim 1, wherein the coding is carried out by appropriate modulation of the signals radiated by the sum pattern and difference pattern, reception means disposed in the craft determining the position of the craft with respect to the antenna radiation pattern, and hence its position with respect to the axis of the antenna, the determination of this position being performed by demodulating the signals captured by the reception means.

3. Process according to claim 1, wherein the suppressed carrier amplitude modulated signal is a pulse train with zero mean value, 0, π phase modulated.

4. Process according to claim 3 wherein the amplitude is a 0, π phase modulated square amplitude.

5. Process according to claim 1, wherein the modulation is a pseudorandom code of zero mean value.

6. Process according to claim 1, wherein a reference phase of the modulated difference signal is defined by a preliminary synchronization signal transmitted on the sum pathway before a position measurement to the reception means of the craft.

7. Process according to claim 6, wherein the synchronization signal is an amplitude modulated signal modulated according to a predefined pseudorandom code, compressed by a correlator at the reception end.

8. Process according to claim 1, wherein a same signal transmitted and reflected by a target is used to track said target, the reflected signal being captured on the sum pattern of the antenna.

9. Process according to claim 1, wherein information is sent to at least one craft by the beam.

10. Process according to claim 9, wherein the information conveys a position of the target with respect to the beam so as to allow the determination of the relative position of the craft to the target.

11. Process according to claim 1, wherein the microwave transmission is made in a Ku band.

12. Device for implementing the process according to claim 1, comprising at least one radar part producing a beam coded in space, said at least one radar part comprising:
    a monopulse antenna including a sum pathway, a list difference pathway, and a bearing difference pathway, for transmission, each difference pathway being linked to a modulator which modulates a wave to be transmitted;
    a microwave switch which switches signals to one or other of the two difference pathways;
    an amplifier for signals of the difference pathways and an amplifier for signals of the sum pathway;
    a microwave source which supplies microwave signals to the amplifiers via a 3 dB coupler;
    an amplitude modulator disposed between the microwave source and the coupler, this modulator carrying out a modulation with zero mean value of an amplitude of the signal which it receives,
    wherein the coding of the beam is carried out by superposition of an unmodulated wave onto the sum pattern and of a suppressed-carrier amplitude modulated wave onto the difference pattern.

13. Device according to claim 12, wherein an amplitude modulator is connected at an output of the amplifier of the sum pathway, the modulator being controlled by a code generator so as to modulate the wave transmitted according to a code.

14. Device according to claim 12, wherein a duplexer is disposed on the sum pathway, a reception output of this duplexer being linked to an input of a mixer whose other input receives as local oscillator signal, the reception signal thus frequency transposed is sent to reception and signal processing means.

15. Device according to claim 12, wherein the receiver comprises at least two correlators processing a digitized reception signal, a first of the two correlators being assigned to the processing of the signal of the sum pathway and a second of the two correlators being assigned to the signal of the difference pathway, a correlation spike detector being placed at an output of the first correlator assigned to the processing of the sum pathway, a delay device being connected at an output of the correlation spike detector, onward of the detection of a correlation spike, this device successively creating a first delay of T and a second delay of 2T so as to sample the signals at the delays the signals at the output of the second correlator of the difference pathway, the degree of modulation in terms of bearing and elevation being dependent on ratios of the signals thus sampled over the signal of the sum pathway.

16. Device according to claim 15, wherein the correlators operate based on shift registers with a higher sampling frequency than that of a clock generating the pseudorandom modulation code.

17. Device according to claim 15, wherein the receiver comprises at an input a filter and a direct detection device which is connected at an output of the filter, the signal thus filtered and detected being supplied to a linear video amplifier with automatic gain control whose output is linked to an analog/digital converter, the signal thus digitized being processed by the two correlators.

* * * * *